United States Patent
Newman

[11] Patent Number: 6,165,526
[45] Date of Patent: Dec. 26, 2000

[54] MICROBIAL DECONTAMINATION OF FOOD

[76] Inventor: Paul Bernard Newman, Northcote House, Northlew, Okehampton, Devon, United Kingdom, EX20 3BT

[21] Appl. No.: 09/308,364
[22] PCT Filed: Sep. 18, 1998
[86] PCT No.: PCT/GB98/02840
  § 371 Date: Jul. 14, 1999
  § 102(e) Date: Jul. 14, 1999
[87] PCT Pub. No.: WO99/13741
  PCT Pub. Date: Mar. 25, 1999

[30] Foreign Application Priority Data

Sep. 18, 1997 [GB] United Kingdom ............ 9719894

[51] Int. Cl.[7] ................................ A23L 3/32; A23L 3/00
[52] U.S. Cl. .......................... 426/248; 422/24; 99/451
[58] Field of Search ............................ 426/248, 238, 426/241; 422/24; 99/451

[56] References Cited

U.S. PATENT DOCUMENTS

| | | | |
|---|---|---|---|
| 4,255,383 | 3/1981 | Schenck | 422/24 |
| 5,405,631 | 4/1995 | Rosenthal | 426/235 |
| 5,597,597 | 1/1997 | Newman | 426/248 |
| 5,901,564 | 5/1999 | Comeau, II | 62/264 |
| 6,006,659 | 12/1999 | Rosenthal | 99/451 |
| 6,010,727 | 1/2000 | Rosenthal | 426/240 |
| 6,030,653 | 2/2000 | Rosenthal | 426/248 |
| 6,037,598 | 3/2000 | Cicha | 250/455.11 |

*Primary Examiner*—Nina Bhat
*Attorney, Agent, or Firm*—Larson & Taylor, PLC

[57] ABSTRACT

Food is rendered sterile by UV irradiation, preferably with UV at 265±15 nm. A sterilization unit may include UV sources (90, 100, 110, 120) and a heat source, which may be a broad band UV source, a source of IR or microwave radiation. A combined microwave/UV unit can be used to defrost frozen food and simultaneously sterilize it or maintain sterility. Heating prior to UV irradiation can enhance the sterilization, as can rapid cooling after irradiation. Irradiation can also be enhanced by displacing the food during irradiation e.g. by supporting it on a rotatable support (135) and/or by displacing it relative to the support surface.

18 Claims, 5 Drawing Sheets

1

MICROBIAL DECONTAMINATION OF FOOD

This application is a National Stage application 35 U.S.C. 371 of PCT/GB98/02840 filed Sep. 18, 1998.

TECHNICAL FIELD

This invention relates to the microbial decontamination of food, especially on a small, non-industrial scale such as domestically or in catering. It also relates to apparatus for effecting microbial decontamination in these situations.

The presence of microbes on food has two possible consequences: their growth is often the major determinant of the shelf life of the food, and/or their growth either on the food or on ingestion can be the cause of food poisoning. Microbes may gain access to a food at virtually any stage of the food's manufacture, from harvest of the raw materials (a notable source of contamination by soil-borne microorganisms, including several pathogenic types), through post-harvest storage, processing, and distribution. Good practice throughout the food chain from raw material to finished product is intended to ensure that the food that reaches the consumer is wholesome and, above all, safe to eat, yet outbreaks of illnesses attributable to food-borne pathogenic microbes still arise, implying microbial contamination at some link in the chain before the food reaches the consumer.

Both microbial contamination and growth are likely to continue after the food has reached the consumer, of course. Contamination can occur, for example, during selection of food on display, or similarly during harvesting of home-grown produce; microbial contamination to some degree is practically unavoidable during the domestic preparation of ingredients for inclusion in any dish or meal. Microbial growth is influenced by the entire time/temperature history of the food from harvest to consumption, which includes the conditions between the time the consumer selects or purchases the food and their reaching home, and domestic storage.

Consumers are increasingly concerned about food poisoning. Understandably, food poisoning outbreaks that involve fatalities receive much attention from the media, which heightens this concern. The concern is perhaps particularly marked in those with responsibility for feeding people in groups of known susceptibility to food poisoning, such as the very young or old, or those whose immune system is already compromised.

There is therefore a need for a device capable of achieving microbial decontamination of food, without materially affecting the desirable characteristics of the food, on a small scale; most obviously in the home, but also in many catering situations, and even, where appropriate, at the point of sale. The invention described herein enables one to provide such a device. Preferred embodiments of the invention may be versatile units, being suitable for use in a variety of situations. They may be used to decontaminate food and food ingredients in the home (for example, prior to inclusion as ingredients of a recipe, or before transfer to a domestic refrigerator or freezer), or decontaminating chilled foods intended for eating cold such as salads and fruit; in short, they can be used in most situations where the consumer is aware of, or concerned by, the possibility of contamination or spoilage.

BACKGROUND ART

U.S. Pat. No. 4,233,323 discloses a small-scale apparatus for tenderising meat. A casing contains a grid for supporting meat, and UV tubes for irradiating meat. Irradiation periods of one hour are disclosed, using UV in the range 265–300 nm.

WO94/24875 discloses industrial equipment for the UV-sterilisation of foodstuffs. Batch processing can employ a chamber having a food-supporting grid in a central region, and UV sources distributed around the walls. There may be means for moving the food relative to the grid during irradiation so that portions in contact with the grid do not escape irradiation. WO94/24875 also discloses continuous treatment, as does U.S. Pat. No. 4,877,964. The latter discloses a UV treatment cavity with a roller conveyor for conveying food. Some of the UV sources are below the conveying path, being located between conveying rollers, so that the whole surface of the food can be irradiated.

DISCLOSURE OF INVENTION

The present invention provides a method for the (typically small-scale) microbial decontamination of a food, comprising placing the food in a treatment cavity and subjecting at least its uppermost surface to UV irradiation. In a preferred method, the food is located within the cavity on an apertured or UV-transmissive support. The food may be placed directly on the support inside the cavity, or the food may be loaded onto the support outside the cavity and the loaded support is then transferred to the cavity. In a preferred method, the support is located generally centrally in the cavity and the food and support are exposed to UV radiation from a plurality of UV sources mounted on or adjacent at least one wall of the cavity and directed inwardly towards the centre of the cavity so as to provide irradiation from all or several directions, including irradiating the underside of the support and the underside of the food through the support. The food is usually exposed to UV radiation for 15–120 seconds, preferably 25–60, more preferably 30–45 seconds. In some embodiments the U.V. irradiation conditions are selected so that the UV generates little or no increase in temperature in the product (e.g. under 1°, preferably under 0.1°). The food may be rotated within the cavity during irradiation. The support may rotate to effect said rotation of the food. Alternatively or additionally the food may be displaced relative to the support, preferably substantially radially or substantially arcuately, most preferably substantially arcuately, e.g. during rotation of the support, so as to expose initial contact points between the food and the support to UV irradiation. Rotation and displacement not only help to eliminate untreated areas, they also help to make the treatment more uniform across the food surface, helping to reduce the required treatment times.

I have also found that there are circumstances when controlled heating of the food is desirable. This can serve to enhance the microbicidal effect of the UV irradiation. Generally it will be desired that, for foods which are to be eaten raw and/or stored uncooked, this heating should be insufficient to cause denaturation of proteins in the food. For meat, temperature as low as 27° can cause denaturation of some proteins, so desirably the temperature will not exceed 25°. Superficial heating can be effected by the UV itself (e.g. by using broad band UV) and/or by IR irradiation. Deeper heating can be effected by microwave irradiation. This can be useful for a method of thawing frozen food and ensuring that it is sterile. Of course a heat source such as a source of IR or microwaves can also be used for cooking food, generally after a sterilisation step. I have also found that a step of cooling the product surface rapidly after UV irradiation can enhance the microbicidal action, e.g. reducing the surface temperature to 5° or below, more preferably 0° or below, preferably within 10 or 20 minutes, more preferably within 5 minutes, of the UV irradiation step.

The invention also provides a method for the sterile heating and decontamination of a food, said method comprising applying the microbial decontamination of the food as described above while the food is exposed to a source of microwave energy.

The invention also provides a unit for the (typically small-scale) decontamination of a food, comprising a treatment cavity provided with one or a plurality of UV sources. Preferably, the UV is provided by at least four, more preferably six or eight UV lamps. Preferably, the UV source(s) produce radiation falling essentially exclusively in the wavelength range 220–300 nm, more preferably 220–265 nm, especially 250–265 nm. "Essentially exclusively" in this context means that at least 90%, preferably at least 95% and more preferably at least 98% of the energy of the UV radiation is in the specified range. The surfaces of the inner walls of the treatment cavity are preferably highly UV reflective; that is, they preferably have a refectance to radiation of 254 nm of at least about 35%, preferably within the range 55–90%, more preferably at least about 55%, 60%, 65%, or 70%. Suitable surfaces include polished zinc plated steel and polished aluminium.

The UV lamps may be attached individually to walls of the treatment cavity, or they may be at least partly recessed within the walls. In a preferred embodiment, the lamps are supported on lamp support frames which are attached at their lower end to the floor of the treatment cavity and at their upper end to the upper wall of the treatment cavity. The lamp support frames, which are preferably arcuate, are preferably of tubular construction.

UV lamps within the treatment cavity may be protected from accidental damage or soiling by shields or covers. The shields or covers are usually of UV transmissive material. A lamp may be protected by its own shield or cover, or a shield or cover may protect more than one lamp. In a preferred embodiment, a lamp cover is removably locatable on a lamp support frame.

A unit which is also capable of heating the food may also include one or more heat sources, generally selected from broad band UV tubes, IR tubes and microwave generators.

Units according to the present invention may also be provided with means for rotating the food to be irradiated during at least part of the irradiation. A suitable means of effecting such rotation is a turntable connected to a suitable drive mechanism via a central spindle; the turntable may be removably connected to the central spindle and may further be shaped as to act as a drip tray, for example it may be dished.

Units according to the present invention may also be provided with means for supporting the food to be irradiated, especially for supporting the food generally centrally within the treatment cavity. In a preferred embodiment, the means for supporting the food is a single-shafted food support stand comprising a shaft or rod and a food support, the rod being provided with means for attachment to the central spindle of the turntable and for acting co-operatively with the spindle to effect rotation of the food support. Alternatively, the means for supporting the food may comprise a frame and a food support, the frame when in use resting on the surface of the turntable and being rotated by friction between the turntable and the frame.

The food support is preferably a metal mesh grid, but it may alternatively be of ceramic or plastic materials. It may be of UV transmissive material.

Units according to the invention may be provided with one or a plurality of means for displacing, or deflecting, the food during rotation. A preferred deflector comprises a deflecting blade, a supporting stand, and a rotary member coupled to the blade. Preferably, said rotary member rotates in the contrary direction to the turntable, and preferably at a different rate of rotation. In a preferred embodiment, in use the deflecting blade describes a generally arcuate, or sweeping, movement over but not touching the surface of the food support. In an alternative embodiment, in use the deflecting blade moves reciprocally generally radially over but not touching the surface of the food support. A convenient way of effecting movement of the rotary member is by interaction with the drive mechanism of the turntable.

In another aspect of the invention there is provided a combined decontamination and sterile heating unit, comprising a decontamination unit as described above and a source of microwave energy. Units according to this aspect of the invention sterilise the air within the treatment chamber as they decontaminate the food; such units are especially suitable for the accelerated thawing of frozen food.

In a further aspect, the invention provides a kit for converting a microwave oven into a unit for the accelerated aseptic thawing of frozen food, comprising UV lamp holders, one or a plurality of UV lamps, means for locating said UV lamp holders within the oven compartment of a microwave oven, and means for lighting and controlling said UV lamps within the oven compartment. In a preferred embodiment, the means for locating the UV lamps within the oven compartment are lamp support frames as described above. The kit may also comprise a food support stand, and may further comprise one or more food deflectors.

The invention will now be described with reference to the accompanying drawings.

BRIEF DESCRIPTION OF DRAWINGS

FIG. 2 is a line diagram of a food support stand and a food deflector, suitable for use as accessories to the unit of FIG. 1:

MODES FOR CARRYING OUT THE INVENTION

My researches have shown that the cumulative effect of UV irradiance on micro-organisms is far more complex than conventional theory explains. Total dosage is determined by (Irradiance level*Time of exposure). However if the output of the device is, say, 3 watts/m² then one continuous exposure of 20 seconds is more effective than 2 exposures of 10 seconds each separated by a short delay. In addition, the initial irradiance output (at the desired wavelength of 265 nm±15 nm) will have a very significant effect on microcidal and microstatic properties. A device having a 3 watt/m² output and exposed to a product for 20 seconds will have a considerably lower activity than a 6 watt/m² output exposed for 10 seconds, although the total output from both is 60 joules/m² (1 joule=1 watt*1 sec).

Heat output is also important as so-called medium and high UV power sources have outputs which cover the whole UV spectrum and produce large quantities of energy in the form of radiant heat. This causes rapid denaturation of proteins and fats in many foodstuffs and is clearly undesirable and unacceptable in foods which are to be eaten raw and/or stored uncooked. However I have found that a small increase in product temperature (but not to denaturation point) during treatment with UV can have a synergistic effect. Further synergism has been found if the product is subsequently cooled in a refrigerator after treatment. These synergistic effects are discussed more below.

The final consideration is the output of UV wavelengths outside of the desired range. Longwave UV-A induces pigment changes and denaturation in many foodstuffs. It is also now known that, particularly in animal proteins, the breakdown products from pigment denaturation initiate and/or accelerate lipid oxidation in the same product. This is further accelerated by the presence of UV-B or very shortwave UV (220 nm or less). UV-B rays are also very dangerous to human operators and are known to be primarily responsible for conditions such as erythema, conjunctivitis and sarcoma.

Figure 1:
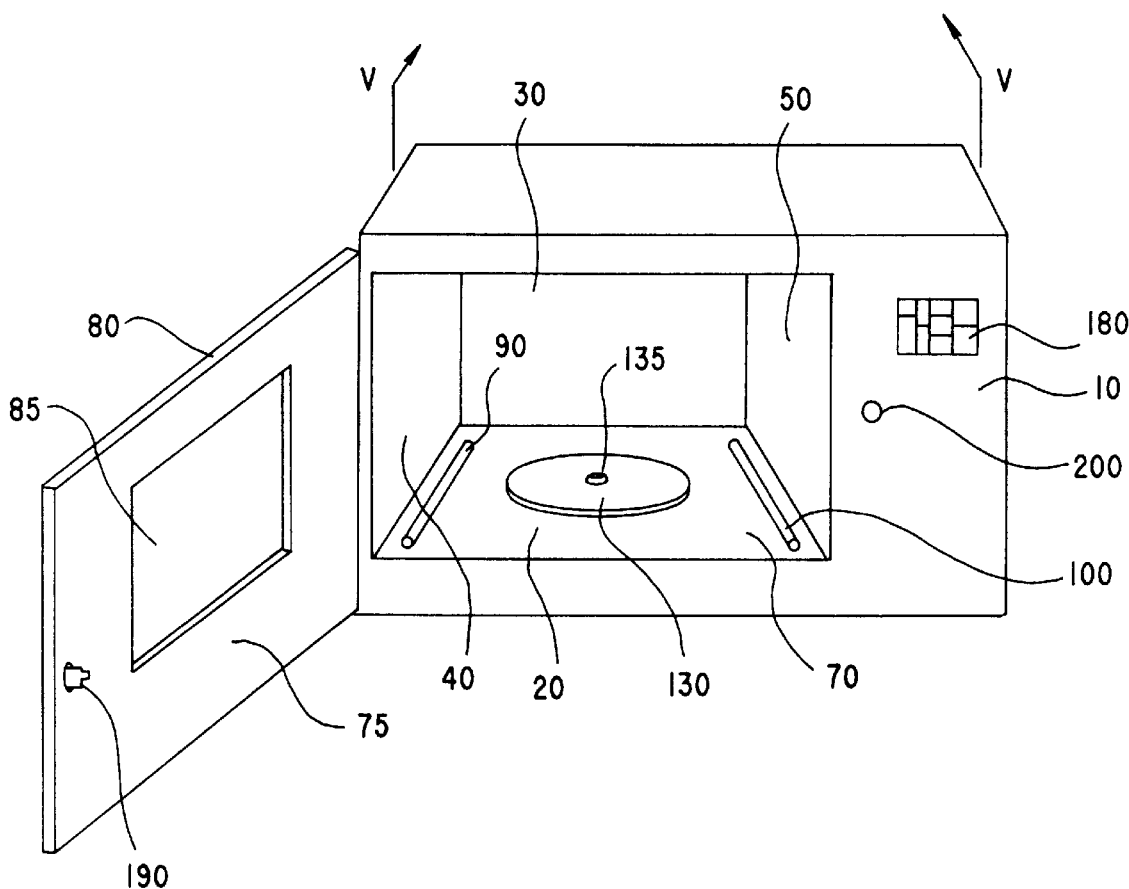
FIG. 1 is a line diagram of a preferred embodiment of the present invention.
Figure 2A:
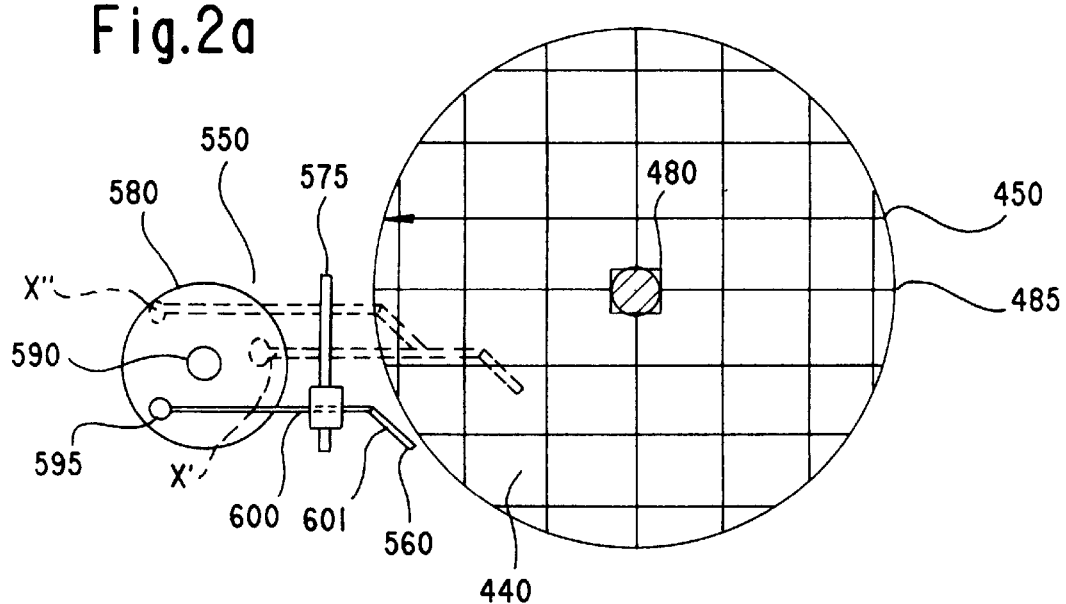
FIG. 2a is a plan view.
Figure 2B:
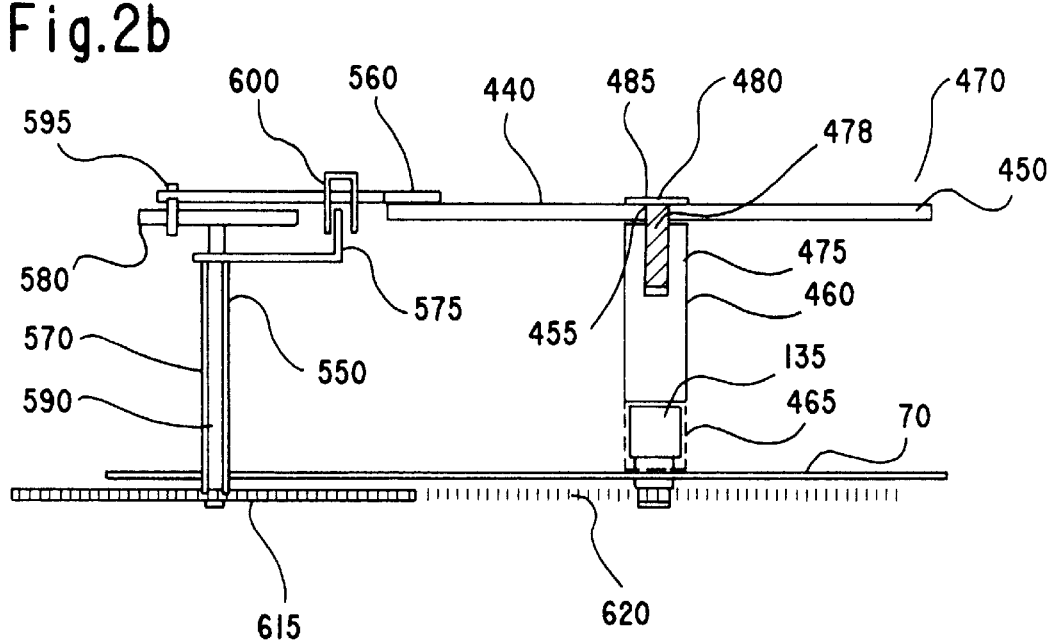
FIG. 2b a corresponding side section.

Referring first to FIGS. 1 & 2: sterilising unit 10 comprises a treatment cavity 20 defined by end wall 30, inner side walls 40, 50, upper wall 60 and floor 70, and (when appropriate) inner wall 75 of door 80. UV irradiation is provided within the treatment cavity 20 of unit 10 by four high intensity UV tubes 90, 100, 110, 120 (See FIG. 4). Floor 70 houses turntable 130 having a raised central spindle 135. The surfaces of walls 30, 40, 50, 60, 75 and floor 70 are generally highly UV-reflective (for example, they may be constructed from polished zinc plated steel or polished aluminium) in order to enhance the efficacy of irradiation, and to help ensure that all exposed surfaces of the food receive comparable amounts of radiation. Optional door window 85 may have a mirrored surface to maintain the reflectivity of inner wall 75. Observation window 85 is substantially UV-opaque, and typically will be of safety glass, perspex, etc.

The food to be irradiated is preferably located within treatment cavity 20 on a stand 470. When assembled in situ, stand 470 (see FIG. 2) comprises an extension rod 460 and a food support 450, which is a mesh grid. Extension rod 460 has a tubular region 465, 475 at either end. At one end of rod 460, the internal diameter of tubular region 465 is slightly larger than the external diameter of turntable spindle 135 so that rod 460 can be located and retained coaxially around spindle 135. At the other end of rod 460, tubular region 475 is designed to receive and house shank 478 of locating pin 480. At the centre of food support 450 is a locating hole 455. Food support 450 is held in position on rod 460 by means of head 485 of connecting pin 480 when shank 478 is housed coaxially in hole 455 and tubular region 475.

The nature of the connection between spindle 135 and tubular region 465 can be any of a variety of types, as can the corresponding connection between shank 478 and tubular region 475: either or both connections may be simple friction or interference fits, or interlocating splines, screw threads, or bayonet-type fittings, etc, may be provided.

Optimum spacing of the interstices of the mesh of food support 450 prevents food falling through the grid while minimising the area of contact between food and grid; overall, the grid has to be sufficiently rigid as to support the product.

The food to be irradiated is placed on upper surface 440 of food support 450 and cavity 20 is enclosed by shutting door 80. Most types of food covering currently available, and especially those used in small-scale operations (eg aluminium foil, self-clinging polyethylene films, etc), are substantially or completely UV opaque. Even relatively transmissive wrapping materials can increase the likelihood of folds and crevices in the food which act as 'dead spots' for UV irradiation. Consequently the food to be irradiated will not usually be covered or wrapped. Once door 80 has been securely shut, irradiation can begin. Exposure time is usually a fixed cycle, dependent upon tube radiance output and required radiance exposure levels. The duration of irradiation is controlled via control panel 180, which can also be provided with audible and visible indications of the cycle, elapsed time, equipment status, etc. Typically, irradiation occurs in a single exposure of 30–45 seconds duration, causing little or no detectable rise in the surface temperature of the food. Turntable spindle 135 rotates food stand 470 throughout the radiation cycle to help ensure that the exposed food surfaces (ie all food surfaces not in contact with food support 450) receive substantially similar amounts of radiation. In a preferred embodiment, the grid will complete one rotation in about 15 seconds.

Safety features, familiar to manufacturers of electrical goods for domestic or catering use, will usually be provided. An example of such features would be to prevent operation of unit 10 without door 80 being closed (for example, a door safety lock system can be incorporated such that radiation will not occur unless door catch 190 is securely located in socket 200: further modifications can, of course, be included, such as electronic locking of door 190 in socket 200 which releases in the event of power failure). Sensors can be included capable of detecting the presence and integrity of observation window 85. Opening of the unit during irradiation will immediately abort the operation, and an alarm signal becomes both audible and visible. The alarm signal has to be cancelled manually before operation is allowed to continue.

Irrespective of the general design of the treatment cavity, the contact points between the food and mesh grid 450 will not receive irradiation and will therefore harbour microbes. One or more food deflectors, positioned and angled around the periphery of mesh grid 450 but without contacting upper surface 440 may be incorporated to impart varying degrees of lateral displacement to the food during rotation. An example of this is shown in FIG. 2. Deflector 550 comprises a blade 560, a support stand 570, and a rotary member or wheel 580 mounted on an upright shaft 590. The shaft 590 is housed coaxially within support stand 570. One end of the blade 560 is pivotally mounted (597) to an outer region of the wheel 580. The blade extends through a narrow slot in a slider 600 to overlie the grid 450. Its outer end portion 601 is angled. The slider travels on a guide rail 575 which extends transversely to the blade. Thus when the wheel 580 is rotated by the shaft 590, the blade is carried with it, remaining approximately parallel to its initial direction owing to the action of the slider and guide rail. The end portion 601 of the blade is caused to move generally arcuately across but above upper surface 440 thereby imparting lateral displacement to the food.

FIG. 2a shows the arrangement between food support 450 and food deflector 550 in plan view. The choice of the way in which support and deflector interact to effect food displacement is quite wide, but in a preferred embodiment the wheel 580 rotates in the opposite direction to food support 450; the arrangement shown in FIG. 2a is best suited for a clockwise rotation of the wheel 580 and an anticlockwise rotation of support 450. Deflector 550 is shown, in outline, in two further rotationally related positions (X', X") to illustrate the sweeping action described by blade 560 under the combined influence of the wheel 580 and a guide 575. Other suitable geometries of wheel, guide, etc can be devised empirically.

Rotation of the wheel 580 and its shaft 590 can be effected in a number of ways, of course, but a convenient way is via pulley 615 connected by drivebelt 620 to the drive mechanism (not shown) of turntable spindle 135. Provided the wheel 580 rotates at a different rate to food support 450 the use of a single food deflector 470 is usually found to be satisfactory; however, a plurality of deflectors may be provided and positioned variously circumferentially around mesh grid 450 to act co-operatively to displace the food backwards and forwards across upper surface 440 thereby continually altering contact points, thereby further ensuring all surfaces of the food are exposed to radiation.

Food support 450 may be made from materials other than metal mesh, for example ceramics or plastics. The support need not be apertured if a UV-transmissive material is used for its manufacture.

Figure 3:
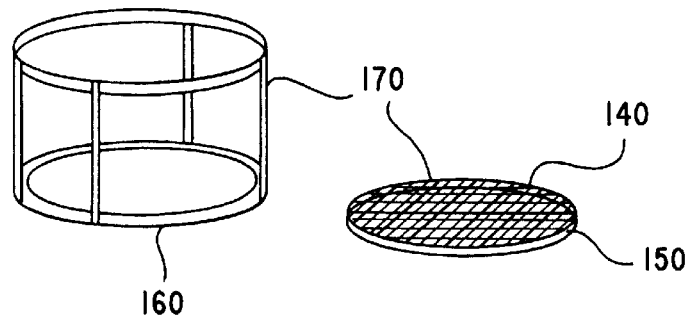
FIG. 3 is a line diagram of a food support stand, suitable for use as an accessory to the unit of FIG. 1.
Figure 4:
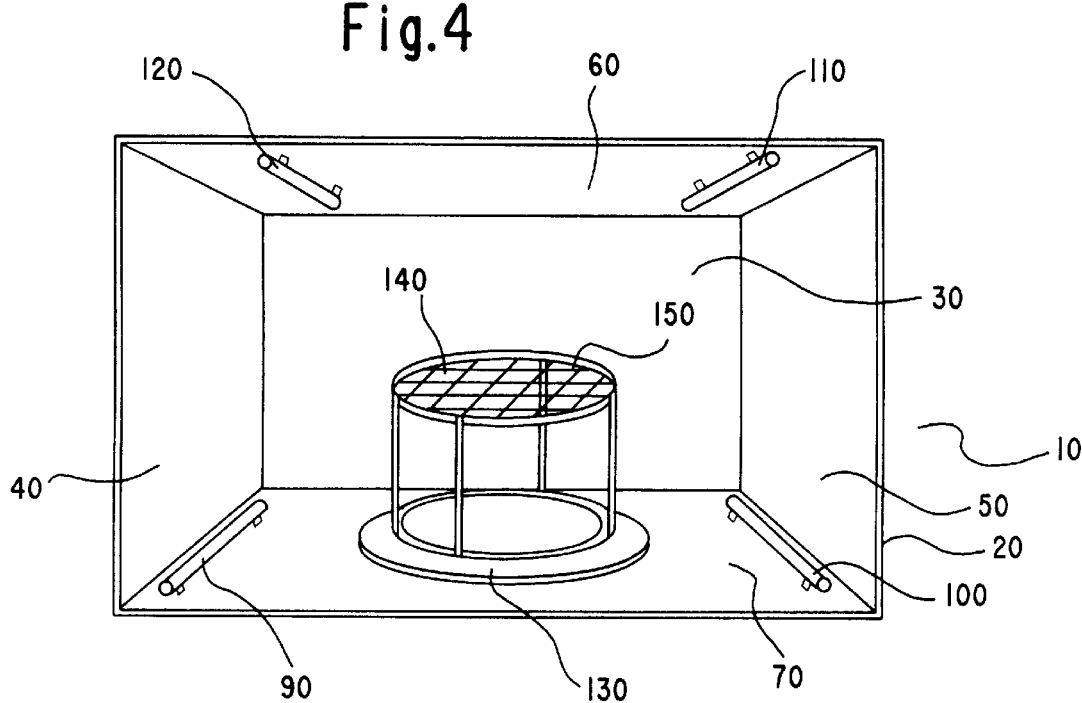
FIG. 4 is a schematic front elevation of the treatment cavity shown in FIG. 1, with the food support stand of FIG. 3 shown assembled and located within the treatment cavity.

An alternative stand 170 is shown in FIG. 3. Stand 170 comprises a frame 160 and a food support 150 which is detachable from frame 160 for facilitating both loading with food and cleaning. Frame 160 should be strong enough to hold the loaded support 150 in position but should also be of a design that does not unduly hinder the amount of upwardly directed UV radiation reaching the underside of the food. The food to be irradiated is placed on upper surface 140 of food support 150. The loaded food support 150 is then located on or in frame 160 and assembled stand 170 is transferred to turntable 130. As shown in FIG. 4 with an unloaded food support 150, when assembled stand 170 is positioned inside treatment cavity 20 the upper surface 140 of food support 150 is located generally centrally within treatment cavity 20. When loaded stand 170 has been positioned in cavity 20, cavity 20 is enclosed by shutting door 80 and treatment proceeds as previously described.

Figure 5:
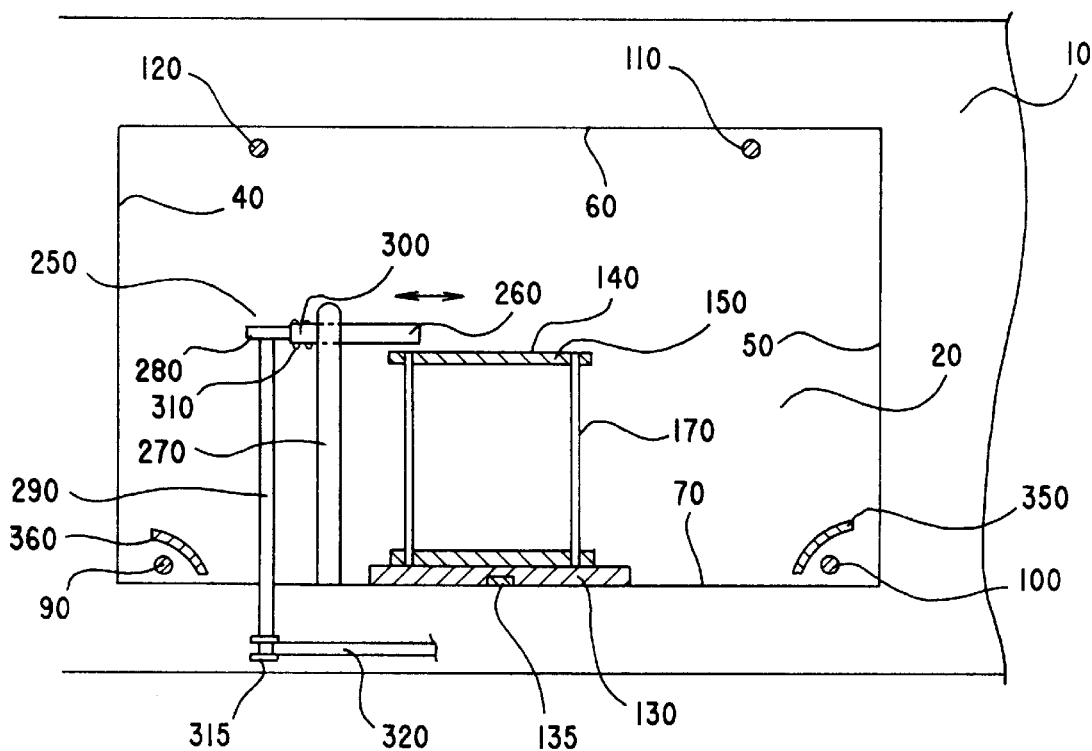
FIG. 5 is a schematic section correspondingly on V—V in FIG. 1 of another unit provided with an alternative food deflector.

In FIG. 5, stand 170 is shown in association with an alternative type of food deflector 250. Food deflector 250 comprises blade 260, support stand 270, and a cam 280 mounted on shaft 290. The shaft 290 and cam 280 are rotated by pulley 315 which is connected by drivebelt 320 to the drive mechanism (not shown) of turntable 130. The shaft 290 and cam 280 are linked to deflector blade 260 via follower 300 and spring 310 such that the rotation of cam 280 causes deflector blade 260 to move reciprocally radially across but above upper surface 140 in the directions shown by the double-headed arrow, thereby imparting the lateral displacement to the food.

Figure 7:
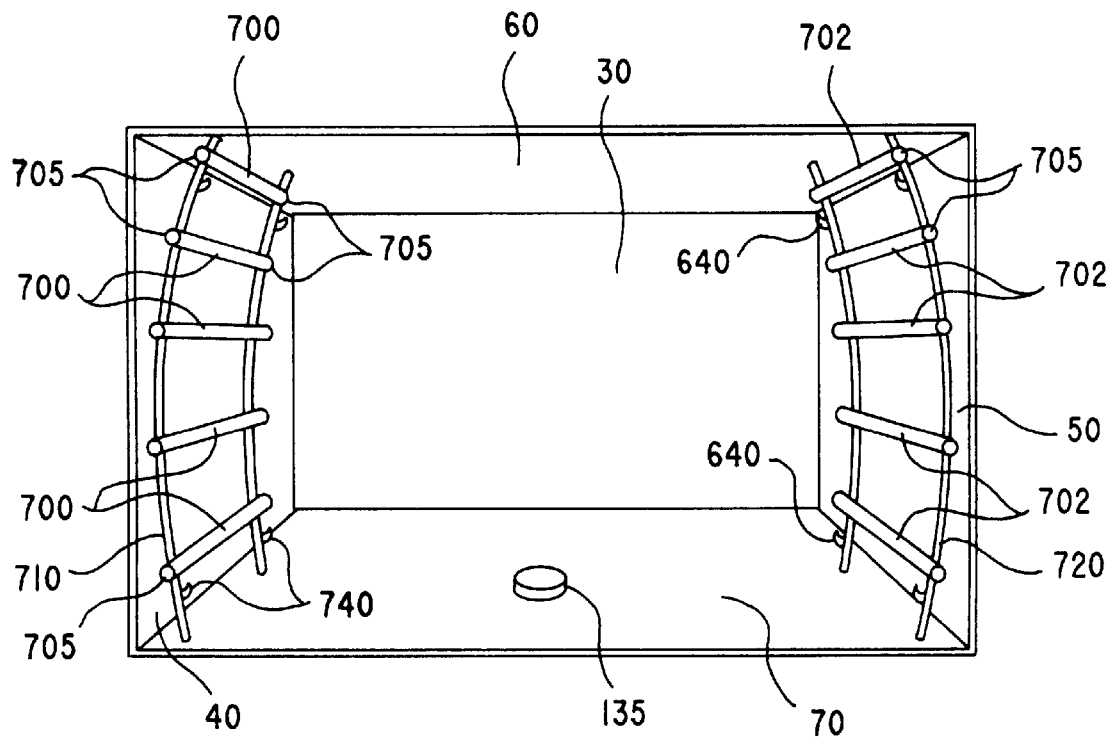

Turntable spindle 135 of FIGS. 1, 2, & 7 performs a second function in those Figures as a connection between a single-shafted stand and the drive mechanism. This function is not required with a stand such as that shown in FIG. 3 which sits on turntable 130 and rotates by virtue of friction between the turntable and the base of the stand, in which case the spindle 135 may be covered by turntable 130 (see especially FIG. 5). In either case, turntable 130 may be removably coupled to spindle 135, and may be designed to serve a secondary function as a drip tray; for example, it may be dish-shaped.

As shown in FIG. 5, floor mounted lamps 90, 100 may be covered along substantially their entire length by lamp shields 350, 360 to protect tubes 90, 100 from breakage by impact with food, etc, that might occur while loading or in operation. Lamp shields 350, 360 must, of course, be apertured or preferably of UV-transmissive material (eg PTFE—"Teflon") to allow irradiation. If shields 350, 360 are of UV-transmissive material they can also prevent debris and juices from the food falling onto the surfaces of the lamps, which would otherwise result in staining, loss of irradiating efficacy, and earlier replacement.

It will be appreciated that simpler—and therefore usually cheaper to manufacture—units than those described here can be designed that would be expected to achieve at least some reduction in microbial numbers. For example, unit 10 can be used without food stand 170 or 470, in which case the under surface of the food will receive little or no radiation. Nevertheless, use of the unit without the stand is still in principle capable of achieving at least about 50% reduction of microbial numbers on the surface of the food, because at least the upper surface of the food can be sterilised. The efficacy of such a reduction in microbial numbers in enhancing shelf life and/or reducing the risk of food poisoning will, of course, depend on a variety of factors and circumstances, for example the nature of the food, the state of microbial spoilage and growth before treatment, the nature of the microflora, and the subsequent handling and storage of the food after irradiation. An alternative to the use of a stand is to provide the unit with one or more food deflectors, similar to those described above but located as to deflect food on a support placed directly on the turntable, and intended to cause complete or partial inversion of the food with each rotation of the turntable. A very basic sterilisation unit would be one in which the turntable was omitted (although rudimentary, it can be imagined that such a unit, when used in conjunction with a food stand such as 170, might achieve greater reduction in bacterial numbers than a unit with a turntable but without stand or deflector, since in the former unit only the contact points and shadows cast by the frame onto the food are not irradiated but in the latter unit the entire underside of the food is not irradiated).

Figure 6:
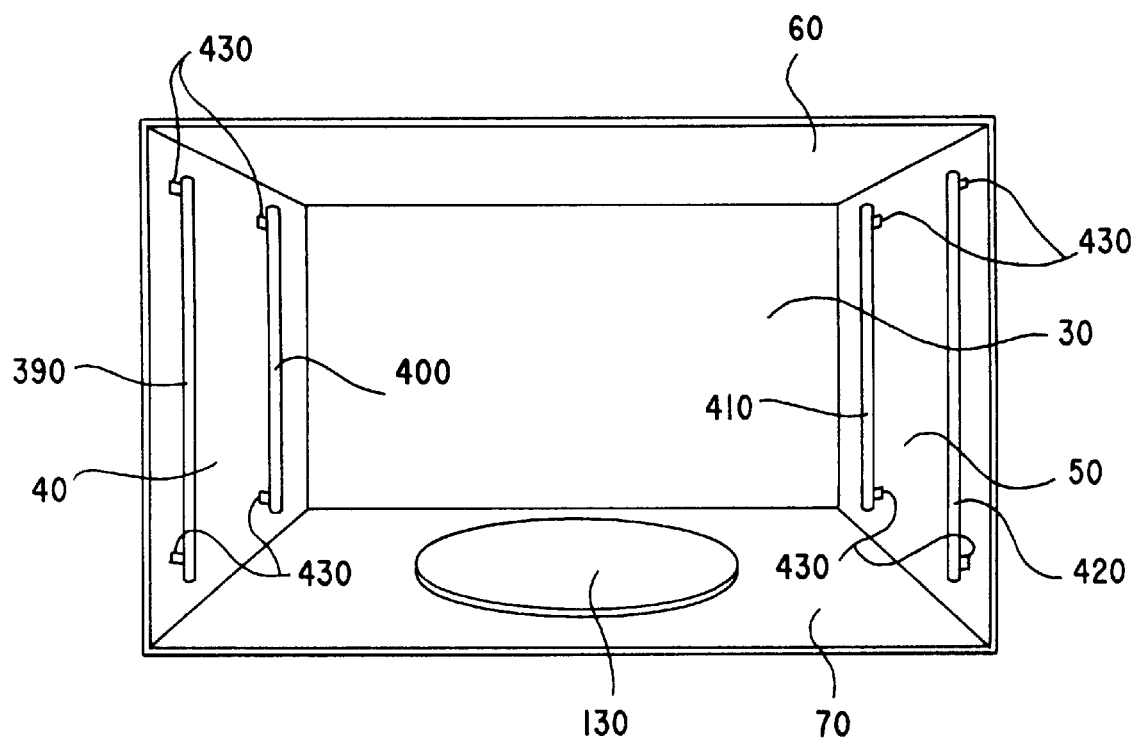
FIGS. 6 & 7 are further schematic front elevations of the treatment cavity and show two alternative arrangements of UV lamps.

The number of lamps used in a sterilisation unit of the present invention, and their location within the treatment cavity, is a matter of choice to the manufacturer determined mainly by the output of the lamps. Suitable UV tubes include especially those which produce radiation falling essentially exclusively in the wavelength range 220–300 nm. Ballasts and starters can be replaced by an electronic lighting and control circuit to help overcome weight and space constraints. The units shown in FIGS. 1, 3, & 4 have four lamps 90, 100, 110, 120 which are shown in paired parallel horizontal arrangement. A similar number of lamps can be used in paired parallel vertical arrangement, as shown for lamps 390, 400, 410, 420 in FIG. 6, or fewer or greater numbers of lamps may be used in either arrangement or a combination of both. In FIG. 6, lamps 390, 400, 410, 420 are shown attached to inner side walls 40, 50 by lamp holders 430 but they may alternatively be recessed within any suitable wall or walls of the cavity.

Figure 8:
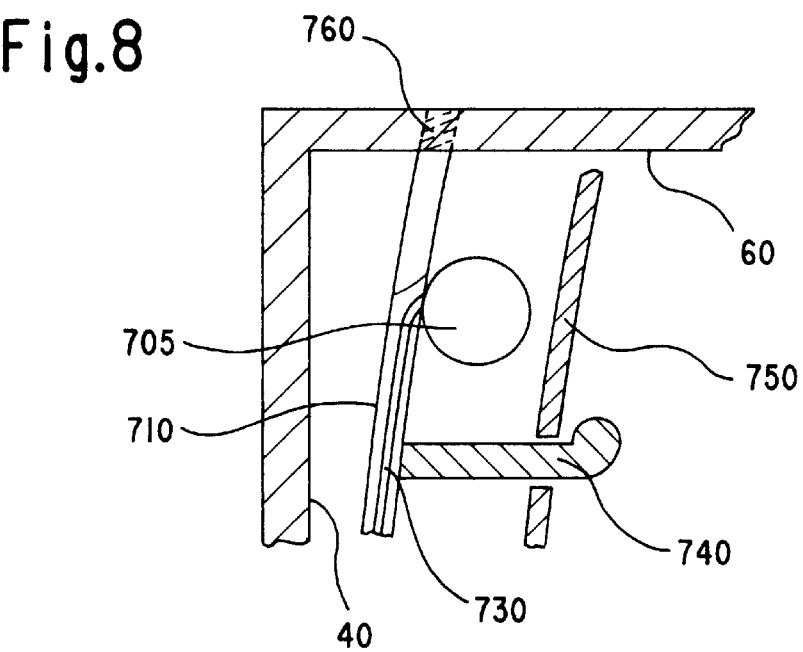
FIG. 8 shows a detail of FIG. 7 in the region of attachment of a lamp support frame to an inner wall of a treatment cavity.

FIGS. 7 & 8 illustrate a further approach to providing treatment chamber 20 with UV-irradiation. UV lamps 700, 702 clip into lamp connectors 705 which are supported on lamp support frames 710, 720. Lamp support frames 710, 720 are preferably of tubular construction as this design conveniently provides neat trunking to receive the wiring 730 associated with lamp connectors 705. Lamp support frames 710, 720 may be further provided at suitable locations with clips 740 for receiving protective cover 750. Cover 750, which is intended to be easily detachable from clip 740 for cleaning by the consumer, performs a similar function to the lamp shields 350, 360 of FIG. 5, but because of its location on the framework, and its preferred one-piece design, protects all lamps 700 or 702 on frame 710 or 720, respectively. Cover 750 is constructed of UV-transmissive material.

Lamp support frames 710, 720 are each fixed to upper wall 60 and floor 70 by means of threaded holes 760.

Since the combined use of turntable 130, stand 170, deflectors 250, and high reflectivity generally within the treatment cavity should ensure that all surfaces of a food are able to be exposed to irradiation originating from anywhere within the cavity, it follows that a unit having a single UV lamp can effect adequate sterilization of food surfaces given a sufficiently long treatment cycle.

Thus far, the invention has been described by reference to examples of dedicated units. In a further embodiment, a combined microwave oven/UV-sterilization unit comprises a sterilization unit as disclosed herein and a magnetron for providing microwave radiation within the same treatment cavity. In a preferred embodiment, the location and number of UV tubes is preferably paired parallel vertical conformation, as shown for example in FIG. 6, although the number and location of tubes will frequently be influenced by the characteristics and location of the magnetron, and vice versa. In a more preferred embodiment, UV tubes are supported on support frames as shown in FIG. 7.

Many existing domestic microwave ovens are convertible to combined units: for example, the components shown in FIGS. 7 & 8 can be provided in kit form. Such a kit therefore includes a pair of support frames 710, 720, each frame being provided with one or more sets of lamp connectors 705 (arranged in pairs to receive the lamps), and a suitable number of UV lamps. For convenience, wiring would be provided to and from the connectors as required and running substantially within the tubes of the support frames, with the ends of the wires suitably finished for ease of connection with appropriate circuitry of the microwave oven. Suitable electronic lighting and control circuitry would normally be included in the kit, preferably at least part pre-connected and located within, or provided with, appropriate housing. Means for connecting the frames to an inner wall would normally be included in such a kit, for example the stands may be provided at either or both ends with flattened extensions or feet for attachment to a wall by adhesive. Attachment may also be as shown in FIG. 8, in which case threaded housings may be included in the kit for locating in suitably cut holes made through inner walls of the oven. (The conversion would need to be effected by a suitably qualified technician, for obvious reasons of safety).

A particular advantage of such a combined unit would be for improved accelerated thawing of frozen foods. A perceived beneficial use of microwave ovens domestically is as a means of accelerating the defrosting of frozen foods. Notwithstanding detailed instruction manuals, it is a potentially hazardous operation domestically as it is very easy in practise to allow the frozen food to heat up too rapidly: bacterial growth can restart at temperatures only slightly above the melting point of the food, especially on the outer surfaces (despite microwaves' theoretical potential for heating frozen food evenly throughout the mass of the food, it is common experience—both commercially and domestically—that uneven heating does occur). A combined unit according to the invention, by irradiating the food with ultra violet throughout microwave-mediated thawing, can virtually eliminate bacterial regrowth especially on the food's surface.

Generally the thawing is effected with a very low intensity, as is understood by those skilled in the art. After the food has thawed it may be cooked. This may also be effected by the microwave oven, using a higher intensity of irradiation. UV irradiation may not be necessary during cooking.

I have indicated in FIG. 1 that the illustrated unit may incorporate the features of a conventional microwave oven, including a grille G through which microwave radiation can be fed into the cavity, and controls C for operating the microwave generator.

As mentioned above, I have found that heating and cooling can potentiate the microbicidal effects of the UV irradiation. This will now be exemplified.

Experiment 1: Heating

Food articles (raw pork chops) initially at 4° C. were divided into two groups. A portion ("A") of the chops of the first group were irradiated with UV (narrow band, 265 nm peak) at 5 w/m$^2$ for 45 seconds. Microbiological testing was then carried out to determine their total plate count ("TPC") and the number of coliform bacteria. As a control ("A(c)") the chops which had not been irradiated were also tested.

The second group of chops were heated to raise their surface temperature to 25°. A portion ("B") were then irradiated under the same conditions as the A chops whereas the remainder ("B(C)") were not irradiated. Microbiological testing was carried out as before. The results are shown in Table 1.

TABLE 1

| CHOPS | A | A(c) | B | B(c) |
|---|---|---|---|---|
| TPC | 130 | 55000 | 70 | 58000 |
| COLIFORMS | 21 | 165 | 0 | 168 |

Experiment 2: Cooling

As in Experiment 1, pork chops were subjected to four different regimes (A, A(c), B and B(c)) and then subjected to microbiological testing as before.

Chops A and A(c) had a surface temperature of 20° C., The chops A received UV irradiation as used in Experiment 1 whereas the chops A(c) were merely maintained at the same temperature.

Chops B were irradiated in the same manner as the chops A, and then cooled to reduce their surface temperature to 0°. The chops B(c) were merely cooled. Cooling was effected by placing the chops in a chilled cabinet.

The results of the microbiological testing are shown in Table 2.

TABLE 2

| CHOPS | A | A(c) | B | B(c) |
|---|---|---|---|---|
| TPC | 490 | 59000 | 180 | 39000 |
| COLIFORMS | 34 | 187 | 9 | 179 |

Similar effects have been induced in other red meats, white meats, prepared and processed foods, fruits and vegetables.

It is most dramatic on uneven wet surfaces such as meat and less dramatic on smooth dry surfaces such as fruits where the UV treatment alone is sufficient to establish near aseptic conditions. There is no reason to suppose that a similar effect would not be induced in food groups not yet examined.

What is claimed is:

1. A food treatment unit for the decontamination and treatment of food, comprising:
   a treatment chamber defining a treatment cavity and including a door whereby the cavity is enclosable;
   a food support located in said chamber cavity;
   a plurality of UV sources arranged for irradiating food supported on said food support in said chamber cavity said UV sources comprising at least one first source arranged to irradiate food located on said food support from above and at least one second source arranged to irradiate food located on said food support from below; and
   a heat source arranged to effect heating of food supported on said food support in said chamber cavity.

2. A food treatment unit according to claim 1 wherein said food support comprises a turntable and the unit further includes a motor coupled to said turntable to effect rotation thereof.

3. A food treatment unit according to claim 1 wherein said support has a discontinuous support surface having UV-transmitting interstices and relatively UV-opaque support portions, and wherein said unit further includes a displacement assembly operable to displace food supported on said food support so that portions of the underside of the food initially shielded from the UV radiation by support portions can be irradiated.

4. A food treatment unit according to claim 1 wherein said heat source comprises a source of microwave energy.

5. A food treatment unit according to claim 1 wherein said heat source comprises a source of infrared energy.

6. A food treatment unit according to claim 1 wherein said heat source comprises a source of broad band UV energy.

7. A method of treating food comprising:
   supporting the food on a food support in a treatment cavity of a treatment chamber;
   applying energy to the food to raise at least its surface temperature; and
   subsequently or simultaneously irradiating the food with UV energy from sources located above and below the food support.

8. A method according to claim 7 wherein said application of energy comprises irradiating the food with one or more types of radiating selected from the group consisting of microwave, IR and broad band UV radiation to effect heating.

9. A method according to claim 8 wherein the food support is rotated to rotate the food during irradiation.

10. A method according to claim 8, wherein said support has a discontinuous support surface having UV-transmitting interstices and relatively UV-opaque support portions, and wherein the underside of the food is irradiated through said support surface, said method including displacing the food relative to the support surface so that portions of the underside of the food initially shielded from the radiation by support portions are irradiated.

11. A method according to claim 7 wherein the food is initially frozen and the application of energy comprises microwave irradiation to effect thawing thereof.

12. A method according to claim 11 including a subsequent cooking step wherein the thawed food is irradiated with a higher intensity of microwaves than used for the thawing thereof.

13. A method of treating food comprising:
   supporting the food on a food support in a treatment cavity of a treatment chamber;
   irradiating the food with UV; and then cooling the food to reduce its surface temperature.

14. A method according to claim 13 wherein said surface temperature is reduced to 5° or less.

15. A food decontamination unit comprising a treatment chamber defining a treatment cavity and including a door whereby the cavity is enclosable; a food support located in said chamber cavity; at least one UV source arranged for irradiating food supported on said food support in said chamber cavity; and wherein said food support comprises a turntable and the unit further includes a motor coupled to said turntable to effect rotation thereof.

16. A food decontamination unit according to claim 15 wherein said at least one UV source is arranged to direct radiation through the food support from beneath whereby the underside of food supported on the support is irradiated.

17. A food decontamination unit according to claim 16 wherein said support has a discontinuous support surface having UV-transmitting interstices and relatively UV-opaque support portions and wherein said unit further includes a displacement assembly operable to displace food supported on said food support so that portions of the underside of the food initially shielded from the UV radiation by support portions can be irradiated.

18. A food decontamination unit according to claim 15 having a plurality of said UV sources comprising at least one first source arranged to irradiate food located on said food support from above and at least one second source arranged to irradiate food located on said food support from below.

* * * * *